United States Patent
Lyons et al.

(10) Patent No.: US 6,390,027 B1
(45) Date of Patent: May 21, 2002

(54) CYCLE CONTROL SYSTEM FOR BOILER AND ASSOCIATED BURNER

(75) Inventors: Richard A. Lyons, Hamden; Christopher L. Murray, West Haven, both of CT (US)

(73) Assignee: C. Cowles & Company, New Haven, CT (US)

( * ) Notice: Subject to any disclaimer, the term of this patent is extended or adjusted under 35 U.S.C. 154(b) by 0 days.

(21) Appl. No.: 09/583,515

(22) Filed: May 31, 2000

(51) Int. Cl.[7] .................................................. H05B 1/02
(52) U.S. Cl. .................... 122/14.2; 122/447; 122/448.1; 219/492; 219/483; 219/508
(58) Field of Search ............................ 122/14.2, 14.21, 122/14.3, 477, 448.1; 126/344, 361, 362; 219/492, 295, 481, 483, 488, 501, 506, 508, 518, 519; 392/449, 450, 451, 452, 453, 454

(56) References Cited

U.S. PATENT DOCUMENTS

| | | |
|---|---|---|
| 1,947,725 A | 2/1934 | Macarthur et al. |
| 3,119,266 A | 1/1964 | Atkinson |
| 3,335,334 A | 8/1967 | Albisser ..................... 317/153 |
| 4,019,067 A | 4/1977 | Gladstone |
| 4,027,172 A | 5/1977 | Hamelink |
| 4,034,911 A * | 7/1977 | Baysinger et al. ........... 237/8 R |
| 4,110,740 A | 8/1978 | Akita et al. |
| 4,163,391 A | 8/1979 | Bezard et al. |
| 4,259,982 A | 4/1981 | Bartels |
| 4,263,587 A | 4/1981 | John ........................... 340/620 |
| 4,360,738 A | 11/1982 | Bartels ........................ 307/118 |
| 4,390,793 A | 6/1983 | John |
| 4,467,178 A * | 8/1984 | Swindle ....................... 219/508 |
| 4,482,891 A | 11/1984 | Spencer ...................... 340/620 |
| 4,513,616 A | 4/1985 | Bezard et al. |
| 4,565,930 A | 1/1986 | Bartels ........................ 307/118 |
| 4,646,569 A | 3/1987 | Cosser |
| 4,716,858 A | 1/1988 | Bartels ........................ 122/448 |
| 4,723,122 A | 2/1988 | Maltby et al. |
| 4,731,730 A | 3/1988 | Hedrick et al. |
| 4,761,638 A | 8/1988 | Lozano, Jr. |
| 4,841,770 A | 6/1989 | Davies ........................ 73/290 |

(List continued on next page.)

FOREIGN PATENT DOCUMENTS

| | | |
|---|---|---|
| EP | 0 367 868 A1 | 11/1988 |
| EP | 0 449 112 A1 | 3/1991 |
| EP | 769 662 A1 | 4/1997 |
| JP | 55-3600 | 1/1980 |
| JP | 62-238902 | 10/1987 |
| JP | 63-129221 | 6/1988 |
| JP | 01-179804 | 7/1989 |

OTHER PUBLICATIONS

Y. Yanagida, et al., J. Magn. Soc. Jpn., vol. 22, No. 4–2, pp. 521 to 524, "MR Characgteristics of Spin–Valve Films Coupled with CoA1O Soft Magnetic Layers", 1998.
ASHRAE Journal, tekmar®—Control Systems, Boiler Control Specialist, p. 46 (Feb. 1994).
tekmar®—Data Brochure D269.

*Primary Examiner*—Gregory Wilson
(74) *Attorney, Agent, or Firm*—DeLio & Peterson, LLC (57) ABSTRACT

A cycle control system for use with a boiler having a fluid therein and a method of monitoring a boiler to determine the presence of an adequate level of fluid therein. The cycle control system includes a timing circuit producing a burner control signal having alternating on and off states corresponding to on and off period timers to allow foam to settle so that a probe can accurately check the fluid level in the boiler. A burner monitor circuit monitors when a demand controller turns the burner on and off responsive to demand. The on-period timer is reset whenever the burner monitor circuit indicates the demand control circuit has turned off the burner for a length of time sufficient for the probe to accurately check the fluid level.

20 Claims, 3 Drawing Sheets

U.S. PATENT DOCUMENTS

| | | | |
|---|---|---|---|
| 4,902,962 A | | 2/1990 | Ishikawa |
| 4,903,530 A | | 2/1990 | Hull .............................. 73/304 |
| 4,952,779 A | * | 8/1990 | Eaton-Williams ........... 219/295 |
| 5,110,418 A | * | 5/1992 | Garrison et al. .............. 202/81 |
| 5,220,514 A | | 6/1993 | John |
| 5,224,445 A | | 7/1993 | Gilbert, Sr. .............. 122/448.1 |
| 5,440,668 A | * | 8/1995 | Jones ......................... 392/327 |
| 5,692,676 A | * | 12/1997 | Walker ....................... 237/8 R |
| 5,739,504 A | | 4/1998 | Lyons et al. |
| 5,894,384 A | | 4/1999 | Funayama et al. |
| 5,920,447 A | | 7/1999 | Sakata et al. |

\* cited by examiner

CYCLE CONTROL SYSTEM FOR BOILER AND ASSOCIATED BURNER

BACKGROUND OF THE INVENTION

1. Field of the Invention

The present invention is related to control systems for use with boilers and their associated burners. More specifically, the present invention is directed to foam compensating control systems that periodically turn the burner off to diminish foam and surging in the boiler and allow the true water level to be accurately determined.

2. Description of Related Art

Steam boilers require a minimum level of water to function properly and safely. Failure to maintain this minimum water level within the boiler can result in severe boiler damage and in some circumstances, can lead to boiler explosions.

A common method of monitoring the water level in a steam boiler is the electronic probe-type low water cut-off. This device shuts down the burner in the event that the water falls below the lowest safe level. Such a system uses an electronic probe that measures conductivity between two electrodes. One electrode protrudes directly from the probe into the boiler through a tapping provided by the boiler manufacturer. The second electrode is formed by the conductive boiler shell which is electrically connected to the mounting nut of the sensor.

The conductive boiler liquid, generally water, completes the circuit path between the electrode sensor in the boiler water and the boiler shell. When the liquid level drops below the sensor level, the conductivity between the two electrodes drops significantly. This reduction in conductivity is sensed by the control system and power is removed from the burner. Because the water level in a steam boiler can be very turbulent, a time delay is designed into probe-type controls to prevent short cycling of the burner circuit during momentary dips in the water level.

Under some operating conditions, common in poorly maintained boilers, the aforementioned probe-type cut-offs are limited in their ability to sense the true water level. If a steam boiler is not properly maintained through periodic cleaning, foam can be generated within the boiler which can be as conductive as water and consequently fall within the detection range of conventional probe-type low water cut-offs. For example, in extreme conditions, the water level in the boiler may drop below the sensor to an unsafe operating level. Foam on top of the boiler water, still at the sensor level, can complete the circuit path between the sensor and the boiler shell ground. Thus, although the true water level is below the sensor, the conductivity between the probe and the boiler shell remains high due to the presence of the foam and the burner remains on.

The problem described above is becoming more acute as the industry moves to smaller, more efficient boilers. Since these newer boilers have considerably lower water content than boilers manufactured years ago, contamination and foaming occur more quickly. In addition, since these boilers hold less water, they are more susceptible to low water conditions.

One approach to this problem has been the introduction of foam compensating burner control systems that cycle the burner on and off. The burner is turned on to produce steam, then turned off for an off-period to allow the foam to settle and any sloshing to diminish. Although the water level is constantly being monitored by the probe, the true water level can only be accurately determined when the foam has settled and the water has stopped moving. If the probe indicates that there is adequate water, the burner is then turned on again for an on-period before the boiling is stopped to accurately check the level again.

The on-period duration is selected to be long enough to produce steam, but not so long that there is any significant danger of boiling away water to below the safe level, given that the previous monitoring of the water level showed a safe level. The duration of the off-period is selected to be long enough to allow the foam to settle and water sloshing to substantially diminish so that an accurate detection of a safe water level can be made. An example of a control system of this type is shown in U.S. Pat. No. 5,739,504, assigned to the owner of the present invention: C. Cowles & Company, located in New Haven, Conn. Designs of the type shown in U.S. Pat. No. 5,739,504 have been quite successful, however, the present invention provides several advantageous improvements.

Boilers used with devices of the type described are provided with a demand control circuit to turn the burner on and off. When the boiler is first powered, the demand control circuit will turn the burner on to bring it to the preset temperature or pressure. When that point is reached, the demand control circuit turns the burner off until there is some demand or until heat loss causes the temperature or pressure to fall. This normal operation of the boiler means that the burner will be off for various reasons unrelated to the need to monitor water level. If the burner has been off for long enough to allow settling of the foam, then the probe will accurately determine if there is a low water level. In this situation, there is no need to turn off the burner again until after it has been on for the complete on-period. It is particularly undesirable to turn off the burner while the boiler system is attempting to meet demand, if it is unnecessary.

Prior foam compensating burner control system designs have run the described burner off/burner on cycle to monitor water level independently from the demand control circuit or any other controls on the on/off state of the burner. Thus, prior foam compensating burner controls might turn off the burner to check the water level only a short period of time after a demand has turned the burner on, even if the burner had previously been off for a substantial period of time during which a low water level would have been detected. It is desirable to eliminate this short cycling of the first burner on cycle if the burner had previously been off for long enough to let the foam settle.

Another difficulty with the constant independent cycling of prior foam compensating burner control system designs has occurred when the boiler fluid is at a low temperature, as occurs during initial heating, or during long periods of very heavy demand. If the boiler fluid is at a low temperature and is not boiling, there is no foam or sloshing and no reason to interrupt the burner to let the water settle. Some boilers use the boiler fluid to provide heat for potable hot water systems in a tankless coil design. These systems have a boiler fluid temperature probe that signals when the fluid temperature is low. It is desirable to completely eliminate the burner off cycle, and keep the burner on continuously, as long as the boiler fluid temperature is below a low temperature point signifying that the boiler fluid is not boiling.

Bearing in mind the problems and deficiencies of the prior art, it is therefore an object of the present invention to provide a control system and method for periodically interrupting the fuel supply to a burner of a boiler so as to allow the liquid and foam in the boiler to settle to permit a probe-type low water cut-off sensor to sense the true liquid level in the boiler, while ensuring that the interruptions occur only when needed after the burner has been on.

Still other objects and advantages of the invention will in part be obvious and will in part be apparent from the specification.

SUMMARY OF THE INVENTION

The above and other objects, which will be apparent to those skilled in art, are achieved in the present invention which is directed to a cycle control system for use with a boiler having a fluid therein and a method of monitoring a boiler to determine the presence of an adequate level of fluid therein. The boiler includes an associated burner and a demand control circuit such as is found in a thermostatically controlled heating system and a boiler having a temperature or pressure control for turning on and off the burner responsive to demand.

The cycle control system includes a timing circuit for producing a burner control signal having alternating on and off states. The timing circuit includes an on-period timer having an on-period that controls the on state of the burner control signal and an off-period timer having an off-period that controls the off state of the burner control signal. The off-period is of sufficient duration to allow foam and surging fluid in the boiler to settle to allow accurate determination of fluid level in the boiler. The timing circuit switches the burner control signal to the off state at the end of the on-period and switches the burner control signal to the on state at the end of the off-period. The timing circuit may be implemented in software in a microcontroller.

The timing circuit also includes a burner monitor circuit having an input for monitoring when the burner is on and off as a result of the demand control. The on-period timer is reset by the timing circuit whenever the burner monitor circuit indicates the demand control circuit has turned off the burner for a length of time sufficient to allow foam and surging fluid in the boiler to settle. This avoids prematurely turning off the burner to check the water level immediately after the burner has been off under the demand control for long enough to accomplish that check.

The cycle control system also includes a relay responsive to the burner control signal and connected to enable and disable the burner. The relay permits the demand control circuit to turn on and turn off the burner when the burner control signal is in the on state, and the relay disables power to the burner completely when the burner control signal is in the off state.

In the preferred embodiment of the invention the cycle control system includes a second relay connected in series with the first relay. The second relay disables power to the burner whenever the probe indicates the boiler fluid is low. In the most highly preferred embodiment of the invention the second relay includes a first set of contacts in series with the first relay and a second set of contacts comprising an output for controlling a fluid feeder. The first and second set of contacts work in opposition such that the second set of contacts is closed when the first set of contacts is opened.

In another aspect of the invention the timing circuit includes a low fluid level timer having a low fluid level timer period. The timing circuit starts the low fluid level timer when the probe indicates that the boiler fluid is low and the timing circuit disables power to the burner with the second relay when the probe indicates that the boiler fluid has remained low for the low fluid level timer period. This ensures that the low fluid indication from the probe is real, and not the result of a brief sloshing of fluid in the boiler.

In yet another aspect of the invention the timing circuit includes an input for connection to a low temperature sensor for monitoring the boiler fluid temperature. The cycle control system resets the on-period timer whenever the low temperature sensor indicates the boiler fluid temperature is below a desired temperature. This ensures that the heating of the boiler fluid from below the desired temperature is not interrupted. During heating of the boiler fluid from below the desired temperature, there is no risk of boiling fluid away. The cycle control system may be provided with an output for mimicking the state of the low temperature sensor switch.

To monitor whether the demand controller has kept the burner off for long enough for the probe to sense the fluid level accurately, it is preferred for the burner monitor circuit to include a hold off timer. The timing circuit starts the hold off timer when the demand control circuit turns off the burner, and the timing circuit resets the on-period timer after the hold off timer indicates the demand control circuit has kept the burner off for a length of time sufficient to allow foam and surging fluid in the boiler to settle.

The invention also includes a method of monitoring a boiler to determine the presence of an adequate level of fluid therein. The method preferably includes the steps of:

providing a probe at a predetermined level in the boiler, the probe outputting a signal to indicate the presence or absence of fluid at the probe;

providing a timing circuit having a burner control signal with alternating on and off states to disable the burner for an off-period after an on-period to permit monitoring of the true fluid level in the boiler;

turning off the burner if the probe signal indicates the absence of fluid at the probe during the off-period;

monitoring when the demand control circuit turns the burner off; and resetting the on-period of the timing circuit after the demand control circuit has turned the burner off for a period sufficient to allow foam and surging fluid in the boiler to settle.

BRIEF DESCRIPTION OF THE DRAWINGS

The features of the invention believed to be novel and the elements characteristic of the invention are set forth with particularity in the appended claims. The figures are for illustration purposes only and are not drawn to scale. the invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–2 of the drawings in which like numerals refer to like features of the invention.

Figure 1:
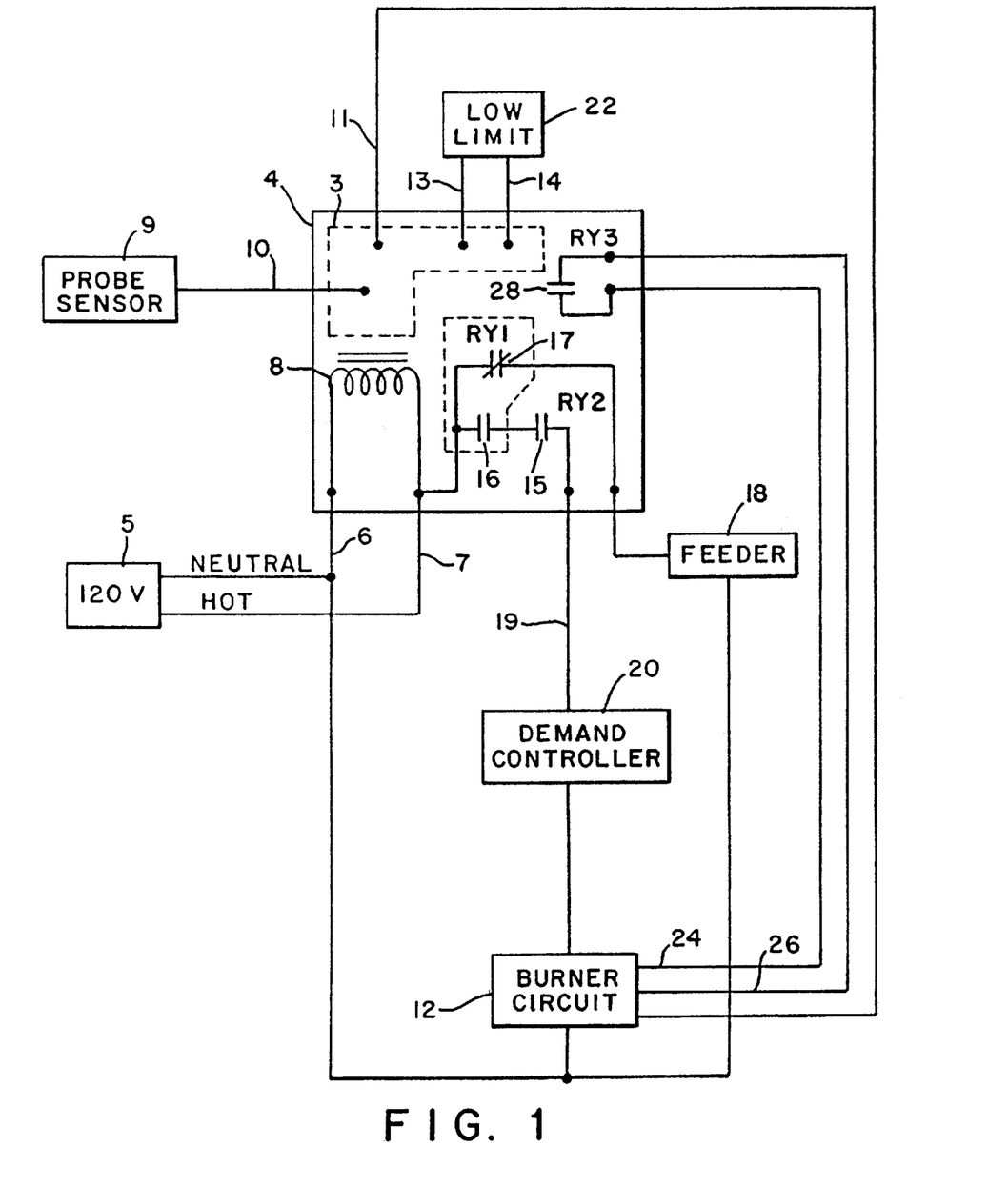
FIG. 1 is a circuit diagram illustrating the present invention, including relays controlled by the present invention, a burner and a water feeder used to automatically supply water to a boiler controlled by the present invention.

FIG. 1 provides a circuit diagram showing how the cycle control system of the present invention is interconnected to a boiler having a burner and a demand control system to turn the burner on and off responsive to demand. The cycle control system includes a timer circuit 3 constructed on a circuit board 4 which is powered by connection to AC power 5 with power leads 6 and 7.

A transformer 8 is used to provide power to the timing circuit 3. Conventional voltage regulation is used to produce the necessary power for the timing circuit, which is preferably constructed conventionally as a digital controller using a microprocessor implementing the program defined in the flow chart seen in FIGS. 2*a* and 2*b*.

Timing circuit 3 is connected to a water level probe sensor 9 via input 10 that allows the timing circuit to detect when the water level is low in the boiler. Input 11 is connected to burner 12 to monitor when the burner 12 is turned on and off by demand control 20 or any other control on the burner 12. Inputs 13, and 14 are connected to the low temperature limit switch 22 to sense when the temperature of the boiler fluid is below the low temperature limit.

The timing circuit 3 controls three relays marked Ry1, Ry2 and Ry3. Relay Ry2 includes a pair of contacts 15 connected in series with contacts 16 of Ry1 which then connect to the hot lead 7 of AC power 5. Relay Ry1 also has a second set of contacts 17 that are open whenever the contacts 16 of Ry1 are closed and which close whenever the contacts 16 of Ry1 are opened.

Contacts 17 are located between the hot lead 7 of AC power 5 and a water feeder 18. Water feeder 18 can supply water to the boiler to increase the water level when a low water condition is detected. The timing circuit 3 causes relay Ry1 to change state whenever it detects a low water condition as described in greater detail below. When the boiler water level is low, contacts 17 are closed to power feeder 18 and replenish the boiler with water. This automatically and simultaneously opens contacts 16 of Ry1 to prevent the burner 12 from receiving power. When the desired fill level is reached, contacts 17 are opened to turn off the water feeder and enable power to the burner.

Whether enabling power to the burner through Ry1 actually turns the burner on depends on the state of Ry2 and any other controls on the burner, such as demand controller 20. The contacts 15 of Ry2 are placed in series with contacts 16 of Ry1 and in series with the power for the burner so that Ry2 can disable power to the burner regardless of the state of any other controls on the burner. Ry2 is used by the timing circuit to cycle the burner between an on-period and an off-period. During the on-period, power is made available to the burner at output 19 so that the demand controller 20, which is typically pressure or temperature activated, can apply power to burner 12. During the off-period, power is removed from the burner so that foam can settle and any sloshing of the boiler fluid will diminish and a true fluid level can be sensed by probe sensor 9.

The low limit circuit 22 is typically a simple temperature activated switch. Boilers that are designed without the present invention will typically have the low limit switch connected to points 24, 26 on the burner circuit. During installation of the present invention in the field, the low limit switch is disconnected from points 24, 26 and reconnected to inputs 13, 14. This allows the timing circuit to accurately determine when the temperature of the boiler fluid is actually low without interference from other controls on the burner.

To replace the functionality of the low limit switch 22, Ry3 marked with reference number 28 is used to mirror the status of that switch. When switch 22 signals that the temperature is low, Ry3 is closed by the timing circuit 3 to connect point 24 to point 26 exactly as if the low limit switch itself had been connected to points 24 and 26.

Figure 2A:
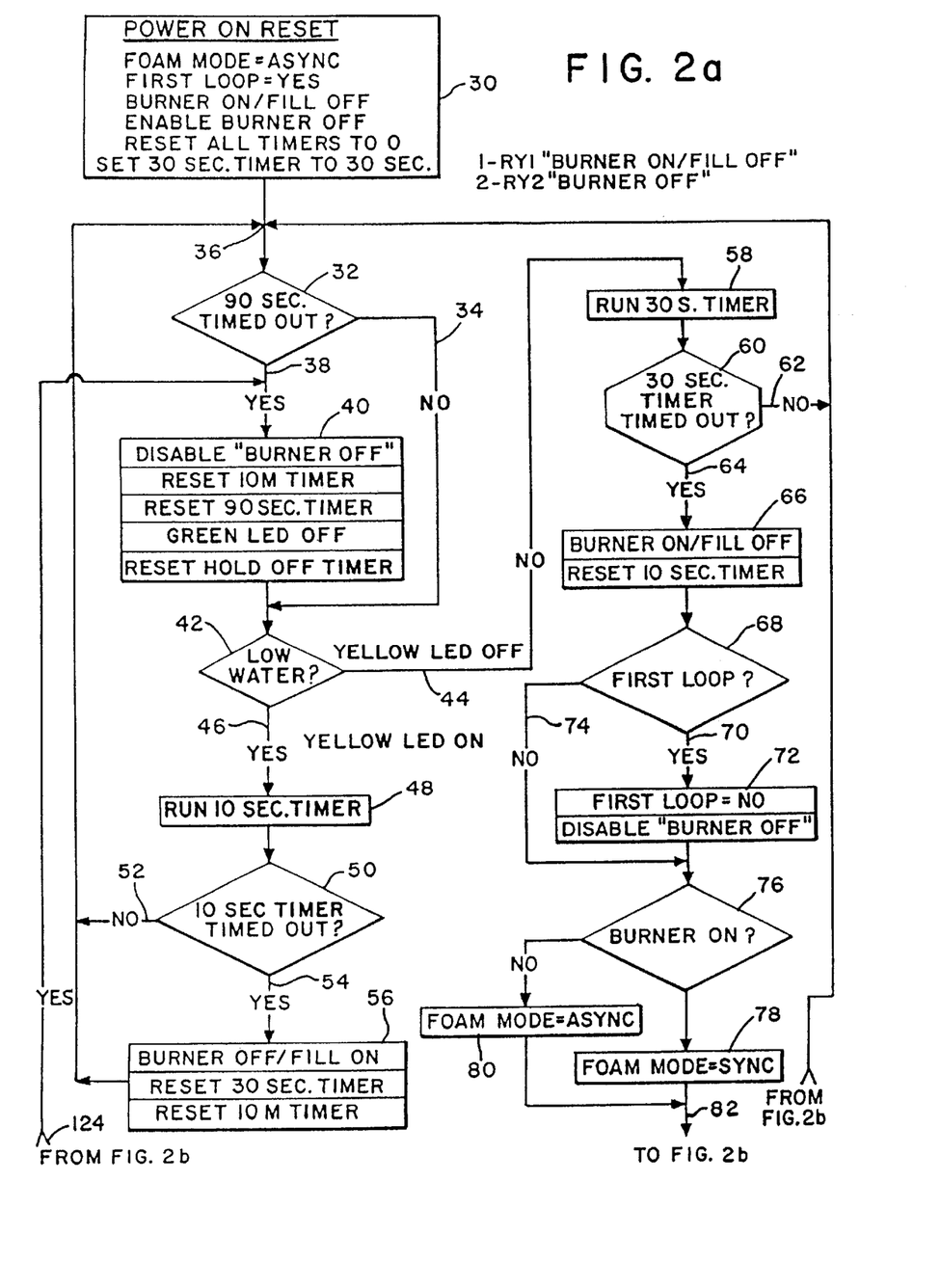
FIGS. 2a and 2b show a flow diagram of a program used in a microcontroller implementing the present invention.
Figure 2B:
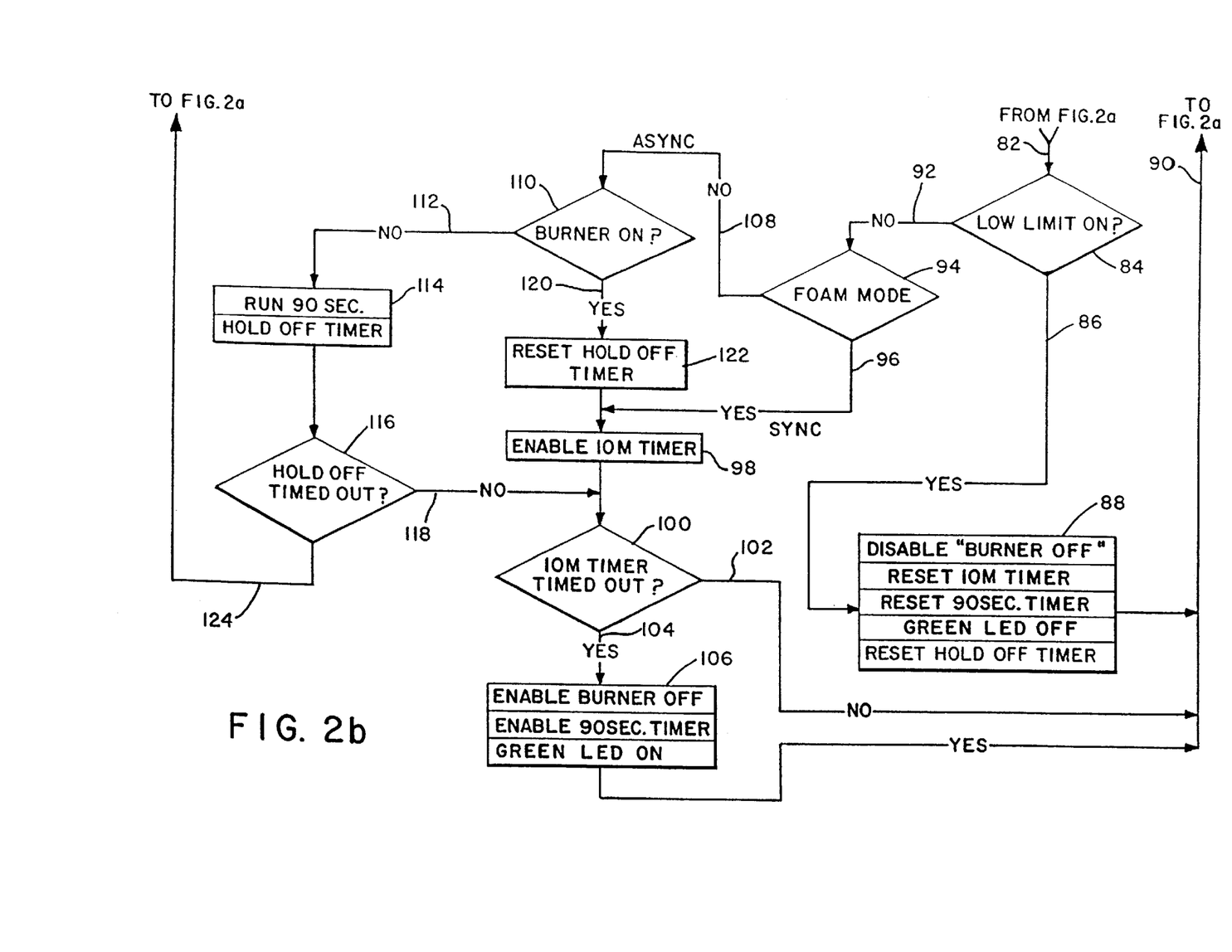

FIG. 2 shows a flow diagram of the timing circuit of the present invention. The timing circuit is preferably implemented in a program run on a digital microcontroller. However, the timing circuit may also be constructed as an analog circuit or as a hard wired digital circuit using known techniques.

The flow diagram begins in box 30 where a number of initializing steps occur when the microcontroller is first powered. These steps include setting the Foam Mode flag to Async, the First Loop flag to Yes, the Ry1 relay to Burner On/Fill Off, the Ry2 relay to Burner Off, and resetting all timers to zero with the exception of the 30 second Fill Timer which is set to the 30 second timed out state.

Relays Ry1 and Ry2 are controlled by outputs from the microcontroller, and conventional driving circuits are used to power the relays from the low power digital outputs of the microcontroller. The timing circuit uses numerous timers which are explained below and these timers may be actual timers, separate registers in the digital microcontroller, or any other programming technique or circuit may be used to track elapsed time in connection with the various functions to be described. When a timer is "reset" it is set to a starting value where elapsed time equals zero. When they are started or "enabled" they increment upwards until they "time out," i.e., reach their maximum value.

After power on reset in block 30, the microcontroller immediately begins looping through the diagram seen in FIGS. 2*a* and 2*b,* beginning with decision block 32. This block determines the status of the Off-Period Timer which is preferably 90 seconds in duration. Because this is the first loop through the system, the Off-Period Timer would be at its beginning (off time elapsed=0) as initialized in block 30. And the No branch 34 will be taken. The off-period is the duration that Ry2 has kept the burner off as needed to detect a low water condition.

The flow in the flow diagram will constantly be returning to the input to decision box 32 at point 36. At some point, the Off-Period Timer will time out and the Yes branch 38 will be taken out of decision block 32 and the steps shown in block 40 will occur. The steps in block 40 include disabling "Burner Off," i.e. closing contacts 15 on Ry2 which permits the burner to turn on provided that Ry1 and the demand controller are also calling for the burner to turn on.

Additional steps in block 40 also include resetting the On-Period Timer to zero. The On-Period Timer is preferably 10 minutes in duration. The 90 second Off-Period Timer is also reset to zero. Finally, a green LED is turned off. The green LED is turned on during the off-period to indicate that the water level is being checked. Finally, a Hold Off Timer is reset to zero.

In the preferred design of the invention, the On-Period Timer determines how long the burner will be permitted to be on before a check of the water level is made. The Off-Period Timer determines how long after the on-period the burner will be disabled to allow foam to settle. The Hold Off Timer is used to monitor the duration that the burner is held off by some other control on the burner, which will typically be the demand controller 20.

Regardless of whether branch 34 or 38 is taken from decision block 32, decision block 42 is reached and a determination is made as to whether the low water probe indicates that the water is low in the boiler. If the water is at an acceptable level, branch 44 is taken and a yellow LED used to indicate that a low water is being sensed is turned off.

On the other hand, if the water is low, as determined by the probe 9, branch 46 is taken and the yellow LED is turned on. In block 48, a 10 second Low Water Timer is turned on and begins to count upwards towards the 10 second limit. The purpose of the low water 10 second timer is to confirm that the water is actually low and has remained low for at least 10 seconds. This prevents brief sloshing of the boiler fluid from triggering the detection of low water.

In decision block 50 a determination is made as to whether the 10 second Low Water Timer has timed out, i.e., reached 10 seconds. The Low Water Timer may be set to any desired value, however, 10 seconds has been found to be sufficient to provided an accurate determination that the water level is actually low. If the 10 second Low Water Timer has not yet timed out, branch 52 is taken. This will normally be the case the first time decision block 50 is reached as this timer will have just been started in block 48.

From branch 52, a return is made to the top of the flow chart at point 36 and flow continues back through the sequence described above and continues to decision block 50 and out branch 52. This sequence is repeated until the 10 second Low Water Timer times out, provided that low water is constantly being detected in decision block 42. This will be the case as long as the water is actually low and remains low for the full 10 second period of the Low Water Timer.

Once the 10 second Low Water Timer times out, branch 54 is taken and the steps shown in block 56 will be followed. These steps include turning off Ry1 which turns the water feeder on and the burner off. Thus, water begins to enter the boiler from the water feeder 18 in FIG. 1. The 30 second Fill Timer is then reset to the beginning. The 30 second Fill Timer is used to ensure that the water feeder 18 provides a full 30 seconds of fill after the height of the water has reached the level of the probe 9. The 30 seconds of fill is in addition to any filling that occurs before the low water check in decision block 42 indicates that the water is no longer low. Note that resetting the 30 second Fill Timer does not start the timer, but only places it in condition for counting up for 30 seconds after it is started. Resetting the Fill Timer also does not actually turn on the water feeder. That occurred in the previous step in block 56 when Ry1 was set to close contacts 17.

After the 30 second Fill Timer is reset, the 10 minute On-Period Timer is also reset. Resetting the 10 minute On-Period Timer places it in condition to begin timing the on-period when it is turned on. Turning on the 30 second Fill Timer and the 10 minute On-Period Timer occurs only after branch 44 is taken, and this branch is taken only after the water feeder has provided sufficient water to reach the level of the probe 9 such that the check on the water level in decision block 42 proceeds along branch 44 and not branch 46.

While it is preferable to use the present invention with an automatic water feeder, manual filling can also be done, in which case branch 46 and branch 54 will continually be taken as long as the water remains low.

After the water has been replenished to the height of the probe 9, the probe will no longer detect a low water condition and branch 44 will be taken. The yellow LED will be turned off to indicate to the user that the water is no longer low and in block 58, the 30 second Fill Timer will be started. In decision block 60, the status of the 30 second Fill Timer is checked. During normal operation, the 30 second Fill Timer will be at zero when block 58 is reached because is was previously reset to 0 in block 56 as a result of a low water condition.

Thus, decision block 60 would normally initially take branch 62 and a loop will proceed out branch 62 through decision block 32, through branch 34, through decision block 42 and back via branch 44. This loop will continue for 30 seconds after the water level has reached the level of the probe before branch 64 is taken out of decision block 60.

This looping out branch 62 would normally continue until the Fill Timer has reached 30 seconds, which is sufficient to fill the boiler to a reasonable level above the low water probe 9. However, when the timing circuit is first turned on, the 30 second Fill Timer is set to the timed out condition i.e. to its maximum setting of 30 seconds. This is done because it is expected that when the unit is first turned on additional filling is not required so the 30 second fill period can be skipped. If sufficient water has not been put into the boiler, this will have been detected at block 42.

As a consequence of the initial setting of the Fill Timer to its maximum value in block 30, on the first pass through block 60, branch 64 will be taken to block 66 at which point Ry1 will be set to turn off the water feeder and permit the burner to turn on. The Low Water 10 second timer will also be reset to zero. Resetting the Low Water Timer initializes it so that it will be ready to operate correctly the next time that low water is sensed in block 42.

After block 66, the First Loop flag is checked at decision block 68. This flag was set to Yes in block 30. Thus, the first time through block 68 branch 70 will be taken to block 72. The First Loop flag will then be set to No and Ry2 will be set to close contacts 15 and permit the burner to be turned on. Alternatively, during normal operation, after the first pass through block 68, branch 74 will be taken.

Immediately thereafter, a check will be made to determine if the burner is on at decision block 76. The purpose of this check is to determine if some other control, such as the demand controller 20 has turned the burner off because at this point Ry1 and Ry2 will have been set to permit power to be applied to the burner.

If the burner is on, the Foam Mode flag is set to Sync in block 78. Sync mode indicates that the burner is being controlled by Ry2 which is turning it on for the on-period of 10 minutes, then off to settle the foam for the 90 second off-period. If the burner is not on, even though relays Ry1 and Ry2 have been set to permit power to be supplied to the burner, then some other control on the boiler must be holding the burner off. In this case, the Foam Mode flag is set to Async in block 80.

Async mode indicates that the On-Period Timer will be reset to zero provided that the burner is actually held off for long enough (as monitored by the Hold Off Timer) by the demand controller 20 (or some other controller) for long enough to let the foam settle.

FIG. 2b shows how the Async Foam Mode flag, which is set in block 80, is used to reset the 10 minute On-Period Timer, and how the low temperature switch is monitored. By resetting the On-Period Timer when the burner is off in decision block 76 the timing circuit ensures that when the burner ultimately turns on, and decision block 76 sets the Foam Mode flag to Sync, a full on-period duration will occur before the off-period will be triggered. This avoids unnecessary premature interruption of the on-period and short cycling.

Referring to FIG. 2b, after the Foam Mode flag is set in blocks 78 or 80, flow proceeds along branch 82 to decision block 84 where the low temperature limit switch 22 is checked. If the low temperature limit switch 22 is signaling that the boiler water temperature is below the preset limit on this switch it indicates that there is no significant risk of damaging the boiler by keeping the burner on. This means it is not necessary to turn off the burner to check the water level, and doing so would simply slow any desired heating of the water.

When the low temperature limit switch 22 signals that the boiler water temperature is low, branch 86 is taken to block 88. In block 88 Ry2 is disabled, i.e. contacts 15 on Ry2 are closed, the 10 minute On-Period Timer is reset, the 90 second Off-Period Timer is reset, the green LED is turned off and the Hold Off Timer is reset. Turning off the green LED shows that the burner is being permitted to run. Flow then proceeds to branch 90 and returns to FIG. 2a at point 36 where flow continues to loop through branches 86 and 88 as long as the low limit switch is on in block 84.

As soon as the low limit switch turns off, program flow switches to branch 92 and the foam mode decision block 94. If the burner was on in block 76, then the Foam Mode is Sync and branch 96 will be taken. This is the normal operation when the burner is providing heat and when normal synchronous cycling between the 10 minute on-period and the 90 second off-period is being used to monitor the water level. In the Sync mode, flow proceeds along branch 96 to block 98 where the 10 minute On-Period Timer is started so that it can begin to count upwards for the full 10 minute duration.

Immediately after the 10 minute On-Period Timer is started, its status is checked in block 100. For the remainder of the on-period, provided the demand controller is keeping the burner on, the program will loop out branch 102, continually returning to the top of FIG. 2a at point 36 and returning to decision block 100. At the end of the on-period, program flow switches to branch 104 and block 106. In block 106, the burner off relay Ry2 is enabled, i.e. the burner is turned off, and the 90 second Off-Period Timer is started. The green LED is also turned on to indicate to the user that the burner is being disabled for the off-period to allow foam to settle.

Starting the Off-Period Timer in block 106 allows it to begin to count up towards the end of its 90 second period and flow continues in a loop through the program through decision block 100 and block 106 until in block 32 (see FIG. 2a) the Off-Period Timer times out.

When the Off-Period Timer times out, flow switches to branch 38 and block 40, where Ry2 is disabled, allowing the burner to turn on. The 10 minute On-Period Timer is then reset, preparing the unit for another on-period, the Off-Period Timer is reset and the green LED is turned off, preparing the unit to count for another 90 second duration off-period and the Hold Off Timer is reset.

At this point, the major loops of the program which control the normal synchronous on-period/off-period can be seen. During the on-period, program flow is through branch 102 and branch 34. These branches skip blocks 40 and 106. During the off-period, flow proceeds along branches 104 and 34 skipping only block 40. At the end of the on-period, the burner is turned off in block 106 and the Off-Period Timer is started. At the end of the off-period, the burner is turned on and both the On and Off-Period Timers are reset in block 40. This cycling between branch 102 and 104 continues as long as the demand control is calling for the burner to remain on and the Foam Mode remains set to Sync.

If the burner turns off during the on-period, as will occur if the boiler has reached the desired operating temperature/ pressure, then the system will enter the Async mode through block 80 and the program will follow branch 108 out of block 94 to decision block 110. If the burner is still off when decision block 110 is reached, flow will proceed out branch 112 and the Hold Off Timer will be started in block 114.

The Hold Off Timer is used to determine if the burner is held off by the demand controller 20 for a period long enough to permit the foam to settle and any sloshing in the boiler fluid to diminish. Accordingly, the preferred duration for the Hold Off Timer is 90 seconds which is the same as the off-period. Once the Hold Off Timer is started in block 114, it is immediately checked to determine if it has timed out in decision block 116. For the period of the Hold Off Timer, flow will normally proceed through branch 118 and ultimately return to the top of FIG. 2a at point 36.

Looping continues between point 36 and branch 118 until the Hold Off Timer indicates that the burner has been turned on or until the Hold Off Timer times out. If the burner turns on before the Hold Off Timer times out, branch 120 out of decision block 110 will be taken and the Hold Off Timer will be reset in block 122. Flow will then continue as described previously. On the other hand, if the Hold Off Timer times out in decision block 116, then flow proceeds out branch 124 which returns to a point directly above block 40 in FIG. 2a. This resets the system exactly as if the Off-Period Timer had just timed out and switches Ry2 to permit the burner to turn on. Block 40 also resets the 10 minute On-Period Timer as well as the 90 second Off-Period Timer and the Hold Off Timer. Flow then continues as described previously.

Thus, the timing circuit incorporated in the microcontroller program described in FIGS. 2a and 2b includes an On-Period Timer that controls the state of a burner control signal which in turn controls the state of a relay, such as relay Ry2. The timing circuit switches the burner control signal to the off state at the end of the on-period in block 106. The timing circuit switches the burner control signal to the on state at the end of the off-period through branch 38 from decision block 32. Decision blocks 76 and 110 form a burner monitor circuit with an input that monitors when the burner is on and off. When the burner is off, branch 112 is used to start the Hold Off Timer and when that timer times out through branch 124, the burner monitor circuit knows that the demand control circuit has turned off the burner for a length of time sufficient to allow foam and surging fluid in the boiler to settle. Accordingly the on-period timer is reset through branch 124 and block 40.

Those of skill in the art will recognize that numerous variations in the flow diagram can be used to implement the present invention as well as the method described above for controlling the boiler.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A cycle control system for use with a boiler having a fluid therein, the boiler including an associated burner and a demand control circuit for turning on and off the burner responsive to demand, the cycle control system comprising:

a timing circuit for producing a burner control signal having alternating on and off states, the timing circuit including:

an on-period timer having an on-period for controlling the on state of the burner control signal, the timing circuit switching the burner control signal to the off state at the end of the on-period;

an off-period timer having an off-period for controlling the off state of the burner control signal, the off-period being of sufficient duration to allow foam and surging fluid in the boiler to settle to allow accurate determination of fluid level in the boiler, the timing circuit switching the burner control signal to the on state at the end of the off-period; and a burner monitor circuit having an input for monitoring when the burner is on and off, the timing circuit resetting the on-period timer whenever the burner monitor circuit indicates the demand control circuit has turned off the burner for a length of time sufficient to allow foam and surging fluid in the boiler to settle; and a relay responsive to the burner control signal and connected to enable and disable the burner, the relay permitting the demand control circuit to turn on and turn off the burner when the burner control signal is in the on state and the relay disabling power to the burner when the burner control signal is in the off state.

2. The cycle control system according to claim 1 further including a second relay connected in series with the first relay to disable power to the burner, the timing circuit including an input for connection to a probe for monitoring fluid level in the boiler, the timing circuit controlling the second relay responsive to an indication of low fluid from the probe.

3. The cycle control system according to claim 2 wherein the timing circuit includes a low fluid level timer having a low fluid level timer period, the timing circuit starting the low fluid level timer when the probe indicates that the boiler fluid is low and the timing circuit disabling power to the burner with the second relay when the probe indicates that the boiler fluid has remained low for the low fluid level timer period.

4. The cycle control system according to claim 2 further including an output for controlling a fluid feeder to feed additional fluid to the boiler when the boiler fluid level is low.

5. The cycle control system according to claim 2 wherein the second relay includes a first set of contacts in series with the first relay and a second set of contacts comprising the output for controlling a fluid feeder, the second set of contacts being closed when the first set of contacts is opened.

6. The cycle control system according to claim 1 wherein the timing circuit includes an input for connection to a low temperature sensor for monitoring the boiler fluid temperature.

7. The cycle control system according to claim 6 wherein the timing circuit resets the on-period timer whenever the low temperature sensor indicates the boiler fluid temperature is below a desired temperature.

8. The cycle control system according to claim 7 wherein the low temperature sensor is a switch and the cycle control system further includes an output for mimicking the state of the low temperature sensor switch.

9. The cycle control system according to claim 1 wherein the burner monitor circuit includes a hold off timer for monitoring the length of time the demand control circuit has turned off the burner.

10. The cycle control system according to claim 9 wherein the timing circuit starts the hold off timer when the demand control circuit turns off the burner, and the timing circuit resets the on-period timer after the hold off timer indicates the demand control circuit has kept the burner off for a length of time sufficient to allow foam and surging fluid in the boiler to settle.

11. The cycle control system according to claim 1 wherein the timing circuit is implemented in software in a microcontroller.

12. A method of monitoring a boiler to determine the presence of an adequate level of fluid therein, the boiler having an associated burner and a demand control circuit with a demand control signal to enable and disable the burner responsive to demand, the method comprising the steps of:

providing a probe at a predetermined level in the boiler, the probe outputting a signal to indicate the presence or absence of fluid at the probe;

providing a timing circuit having a burner control signal with alternating on and off states to disable the burner for an off-period after an on-period to permit monitoring of the true fluid level in the boiler;

turning off the burner if the probe signal indicates the absence of fluid at the probe during the off-period;

monitoring when the demand control circuit turns the burner off; and resetting the on-period of the timing circuit after the demand control circuit has turned the burner off for a period sufficient to allow foam and surging fluid in the boiler to settle.

13. The method of monitoring a boiler to determine the presence of an adequate level of fluid therein according to claim 12 further including the step of providing a relay connected to enable and disable the burner, the relay being responsive to the burner control signal and the relay permitting the demand control circuit to turn on and turn off the burner when the burner control signal is in the on state and the relay disabling power to the burner when the burner control signal is in the off state.

14. The method of monitoring a boiler to determine the presence of an adequate level of fluid therein according to claim 13 wherein the step of turning off the burner if the probe signal indicates the absence of fluid at the probe during the off-period includes the step of providing a second relay connected in series with the first relay to disable power to the burner if the probe signal indicates the absence of fluid at the probe.

15. The method of monitoring a boiler to determine the presence of an adequate level of fluid therein according to claim 14 wherein:

the step of providing a timing circuit includes providing a timing circuit having a low fluid level timer with a low fluid level timer period;

the method further includes the step of starting the low fluid level timer when the probe indicates that the boiler fluid is low; and the step of turning off the burner if the probe signal indicates the absence of fluid at the probe includes the step of disabling power to the burner with the second relay when the probe indicates that the boiler fluid has remained low for the low fluid level timer period.

16. The method of monitoring a boiler to determine the presence of an adequate level of fluid therein according to claim 14 wherein the method further includes the step of controlling a fluid feeder to feed additional fluid to the boiler when the boiler fluid level is low.

17. The method of monitoring a boiler to determine the presence of an adequate level of fluid therein according to claim 16 wherein the step of providing a second relay comprises providing a second relay having a first set of contacts in series with the first relay and a second set of contacts for controlling the fluid feeder, the second set of contacts being closed when the first set of contacts is opened.

18. The method of monitoring a boiler to determine the presence of an adequate level of fluid therein according to claim 12 wherein the step of providing a timing circuit includes providing a timing circuit having an input for connection to a low temperature sensor for monitoring the boiler fluid temperature and the method further includes the step of resetting the on-period of the timing circuit whenever the low temperature sensor indicates the boiler fluid temperature is below a desired temperature.

19. The method of monitoring a boiler to determine the presence of an adequate level of fluid therein according to claim 12 wherein the step of providing a timing circuit includes providing a timing circuit having a hold off timer and the step of resetting the on-period of the timing circuit after the demand control circuit has turned the burner off for a period sufficient to allow foam and surging fluid in the boiler to settle comprises resetting the on-period of the timing circuit responsive to the hold off timer.

20. The method of monitoring a boiler to determine the presence of an adequate level of fluid therein according to claim 12 wherein the step of providing a timing circuit comprises providing a timing circuit implemented in software in a microcontroller.

* * * * *